March 20, 1962 A. H. HABERSTUMP 3,026,000
ELEMENT ARRANGING AND DELIVERING DEVICE
Filed Dec. 9, 1955 6 Sheets-Sheet 1
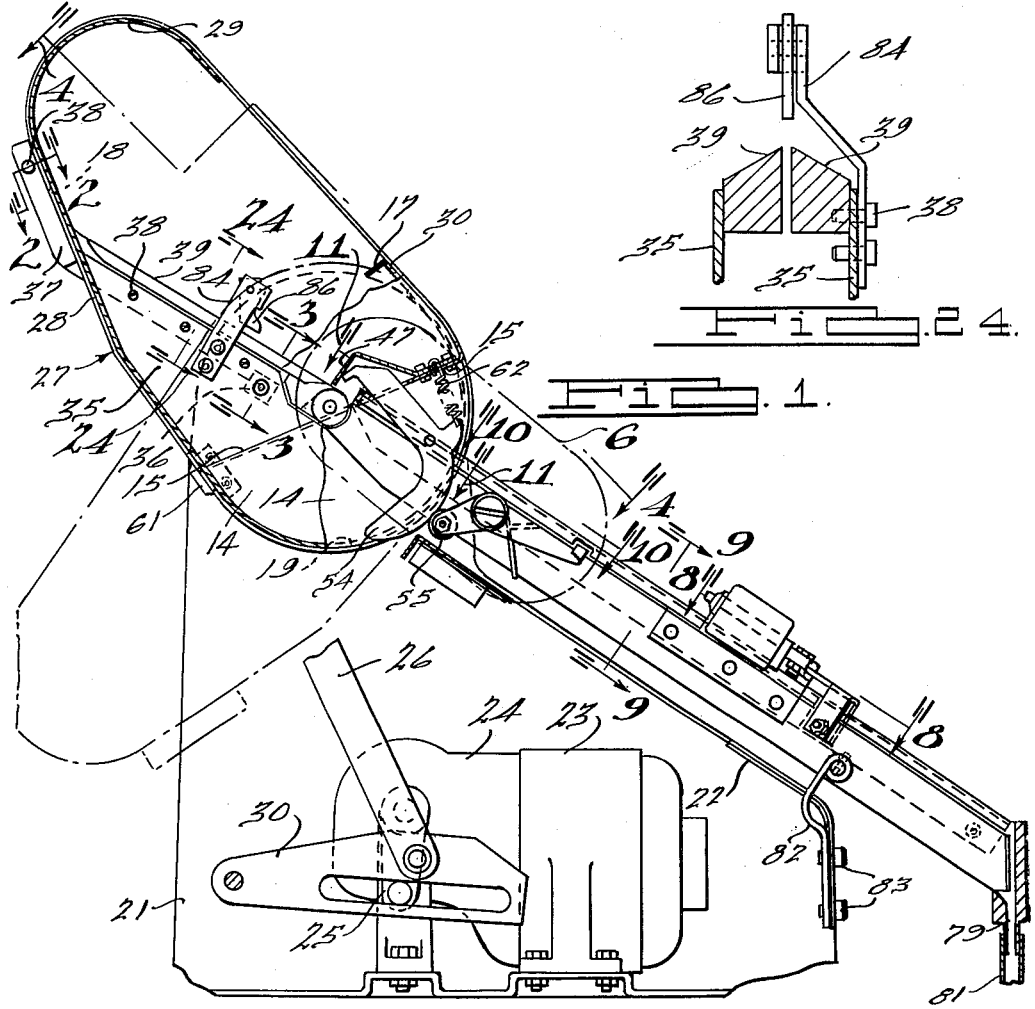
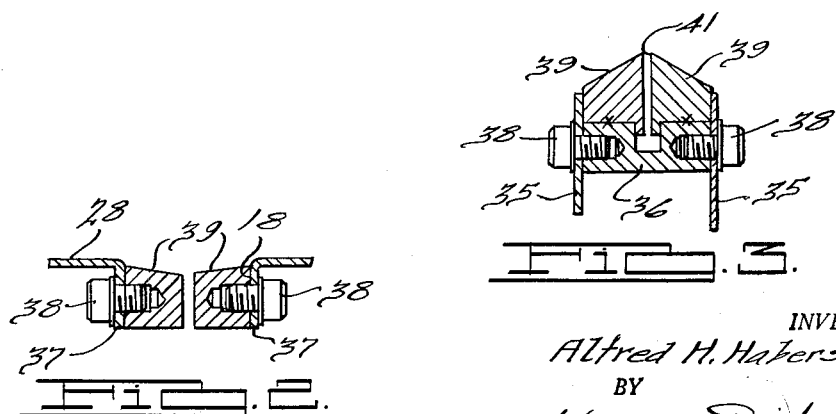
INVENTOR.
Alfred H. Haberstump
BY
Harness, Dickey & Pierce
ATTORNEYS.

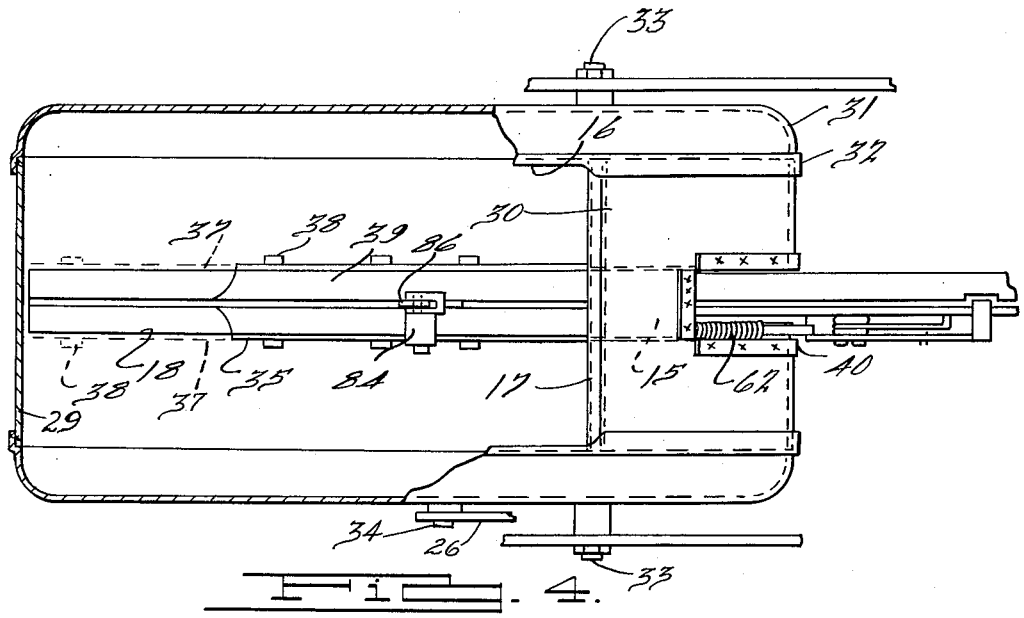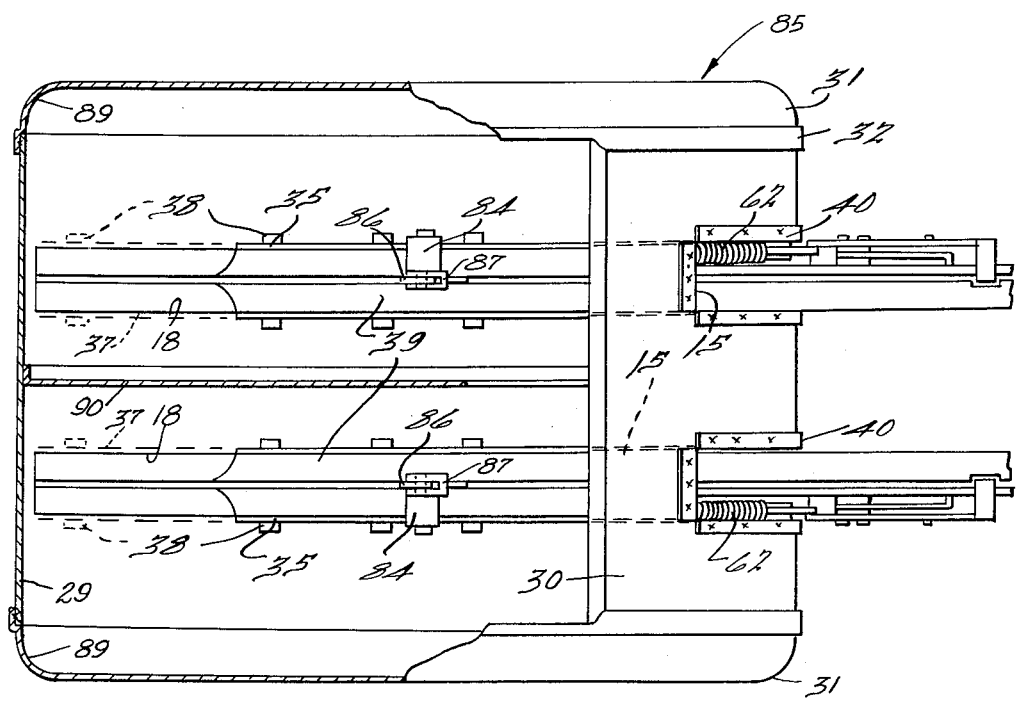

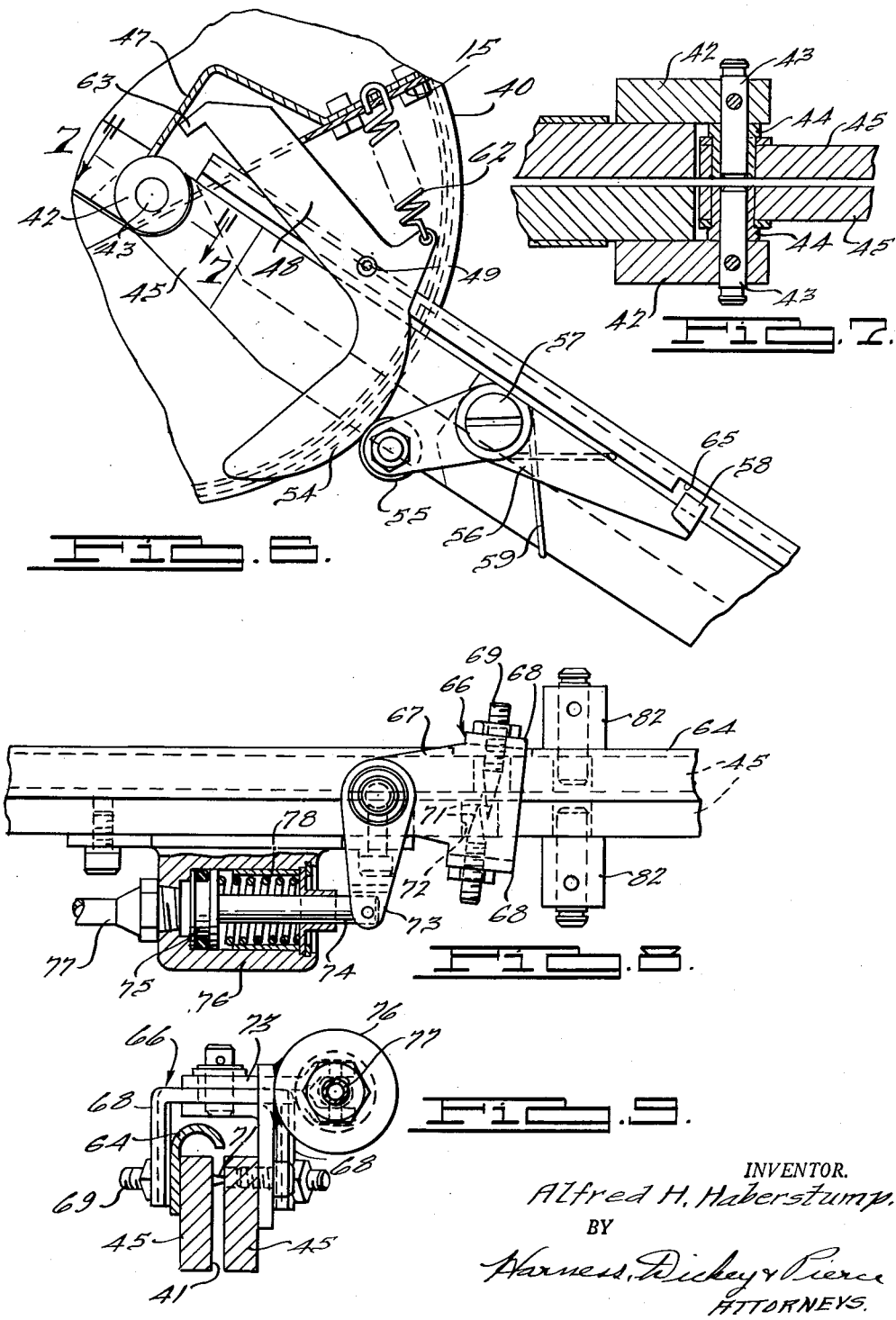

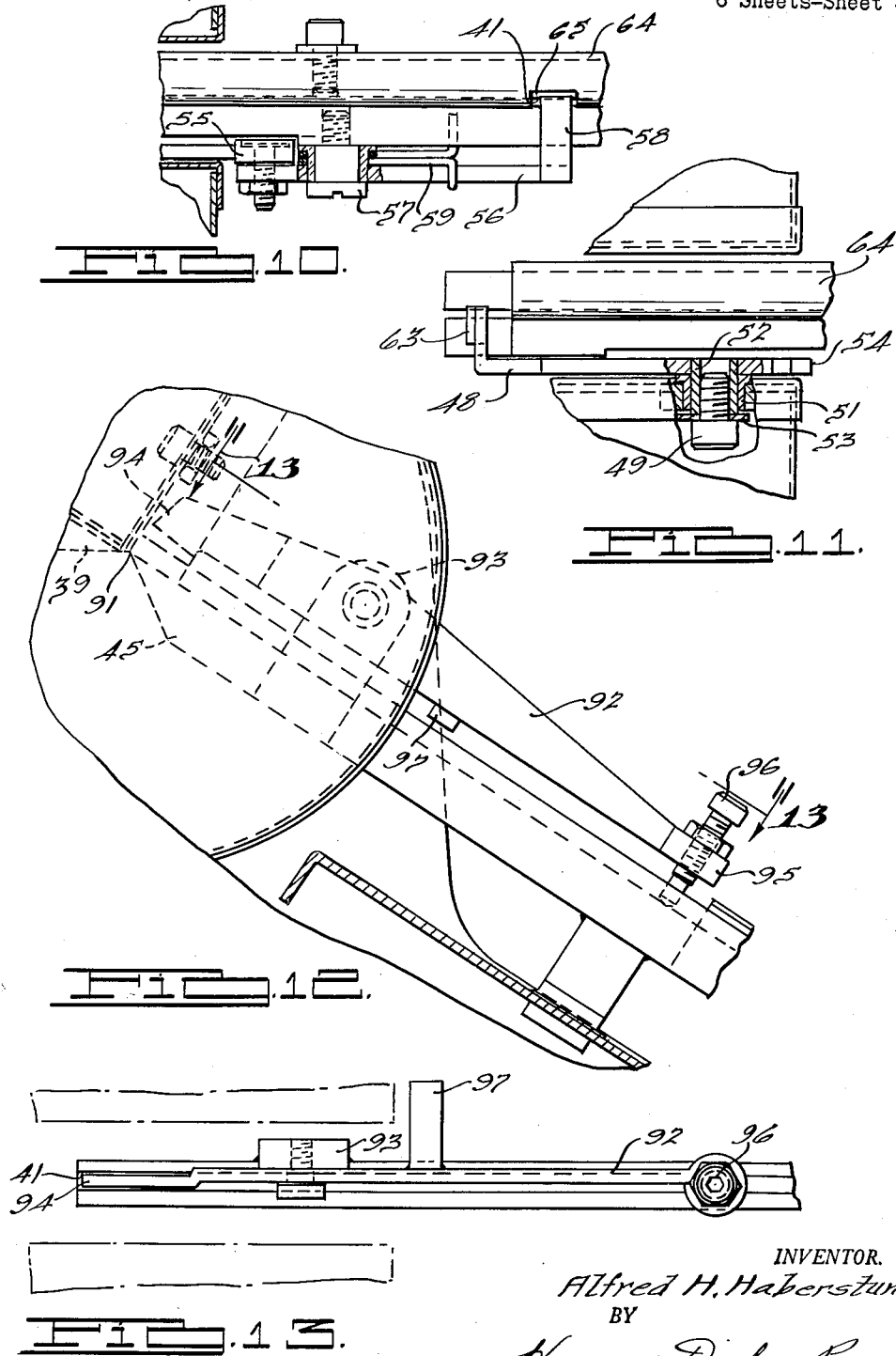

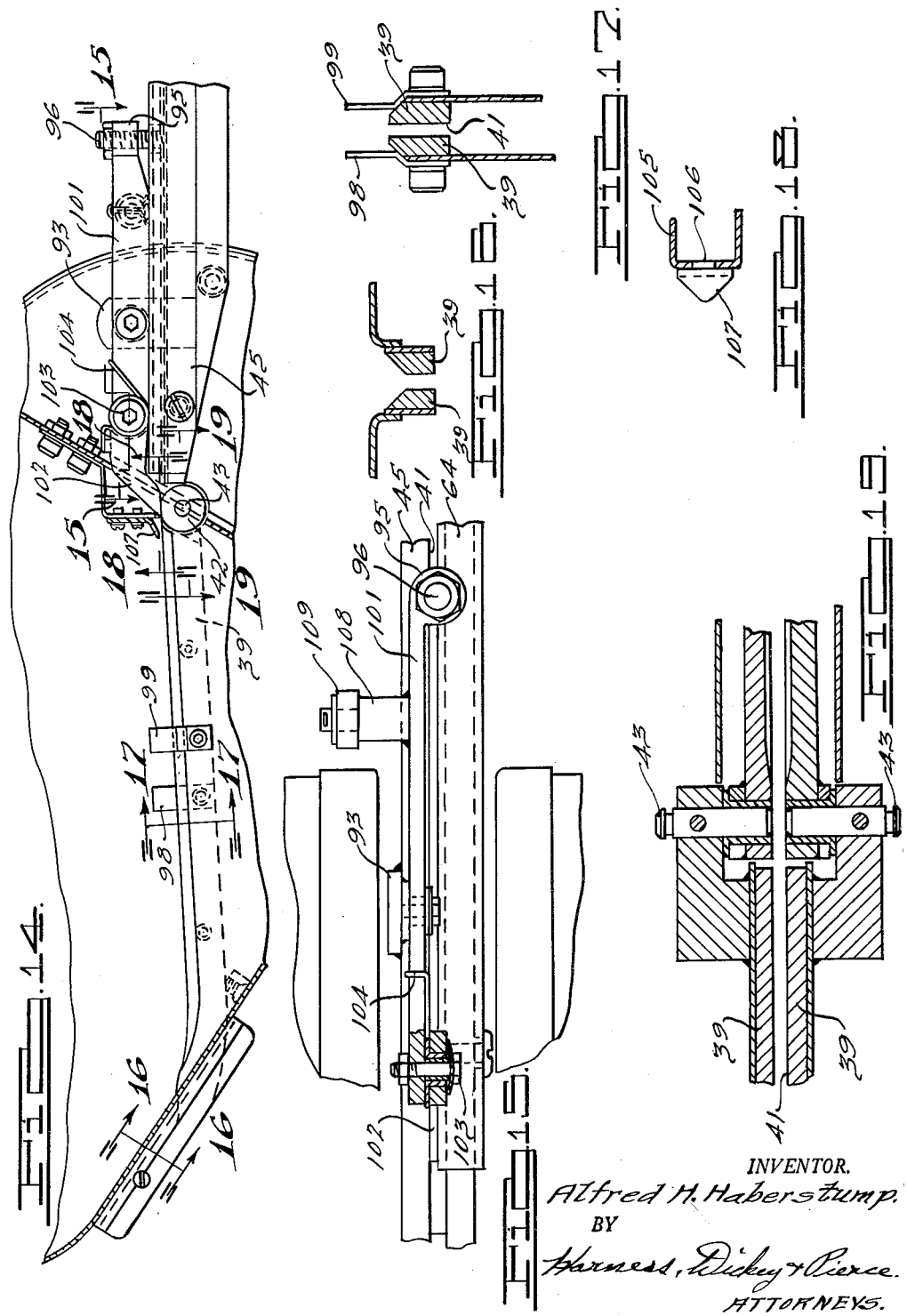

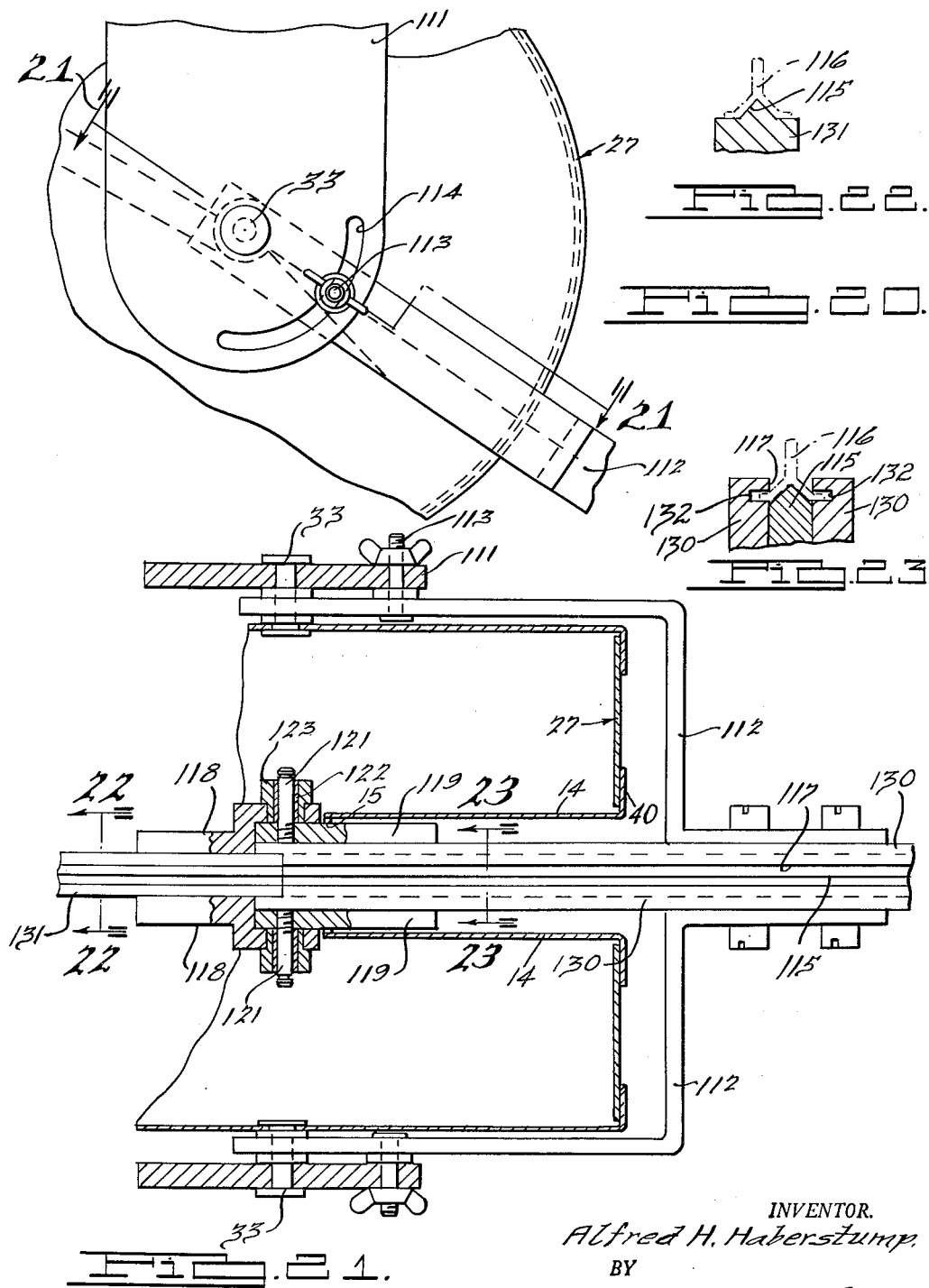

United States Patent Office 3,026,000
Patented Mar. 20, 1962

3,026,000
ELEMENT ARRANGING AND DELIVERING DEVICE
Alfred H. Haberstump, Detroit, Mich., assignor to Haberstump-Harris Inc., Detroit, Mich., a corporation of Michigan
Filed Dec. 9, 1955, Ser. No. 552,130
8 Claims. (Cl. 221—10)

This invention relates to element arranging and delivering devices, and particularly to an arranging and delivering device of the oscillating hopper type.

In the copending application of A. H. Haberstump, Serial No. 325,943, filed December 15, 1952, now Patent No. 2,943,764, July 5, 1960, a reciprocating hopper type of arranging and delivering device is illustrated, described and claimed, of which the present invention is an improvement, this application being a continuation-in-part.

The present invention pertains to a hopper having a bottom with predetermined upwardly curved front and rear ends, with inwardly curved portions at the rear side walls for the purpose of causing the elements within the hopper to slide readily toward the center and be delivered onto the collecting rail mounted within the hopper. On the center of the arcuate front end, pivots are provided for supporting the hopper and the contained rails for oscillating movement. The hopper rails are aligned with the exterior rails when the hopper is in raised position to permit the elements to travel from the hopper onto the rails on the exterior thereof.

Devices are mounted on the rails for controlling the delivery of the elements from the hopper rails to the exterior rails and for delivering the elements from the exterior rails. The hopper may be supported on a standard mounted on a base on which the motor, speed reduction unit, and eccentric element are mounted for operating the pitman which raises and lowers the hopper, as illustrated and described in the above mentioned copending application.

Accordingly, the main objects of the invention are: to provide a hopper arranging and delivering mechanism which is so shaped as to control the movement of the elements within the hopper when oscillated; to provide control devices which are actuated when the collecting rails are filled with the elements to cut off the delivery from the hopper; to provide a delivery control means from the rails which permits a predetermined number of the elements to slide therefrom; to support a hopper from downwardly extending standards as well as the exterior rails which are supported in adjustable angular position thereon, and, in general, to provide a hopper arranging and delivering device for elements which is simple in construction, positive in operation, and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a broken sectional view of a hopper arranging and delivering device for elements, embodying features of the present invention;

FIG. 2 is an enlarged sectional view of the structure illustrated in FIG. 1, taken on the line 2—2 thereof;

FIG. 3 is an enlarged sectional view of the structure illustrated in FIG. 1, taken on the line 3—3 thereof;

FIG. 4 is a sectional view of the structure illustrated in FIG. 1, taken on the line 4—4 thereof;

FIG. 5 is a view of structure, similar to that illustrated in FIG. 4, showing a further form thereof;

FIG. 6 is an enlarged view of the structure illustrated in FIG. 1, as viewed from the area 6 thereof;

FIG. 7 is an enlarged sectional view of the structure illustrated in FIG. 6, taken on the line 7—7 thereof.

FIG. 8 is an enlarged sectional view of the structure illustrated in FIG. 1, taken on the line 8—8 thereof;

FIG. 9 is an enlarged sectional view of the structure illustrated in FIG. 1, taken on the line 9—9 thereof;

FIG. 10 is an enlarged sectional view of the structure illustrated in FIG. 1, taken on the line 10—10 thereof;

FIG. 11 is an enlarged sectional view of the structure illustrated in FIG. 1, taken on the line 11—11 thereof;

FIG. 12 is a view of structure, similar to that illustrated in FIG. 6, showing another form of the invention;

FIG. 13 is a sectional view of the structure illustrated in FIG. 12, taken on the line 13—13 thereof;

FIG. 14 is a view of structure, similar to that illustrated in FIG. 12, showing still another form of the invention;

FIG. 15 is an enlarged sectional view of the structure illustrated in FIG. 14, taken on the line 15—15 thereof;

FIG. 16 is an enlarged sectional view of the structure illustrated in FIG. 14, taken on the line 16—16 thereof;

FIG. 17 is an enlarged sectional view of the structure illustrated in FIG. 14, taken on the line 17—17 thereof;

FIG. 18 is an enlarged sectional view of the structure illustrated in FIG. 14, taken on the line 18—18 thereof;

FIG. 19 is an enlarged sectional view of the structure illustrated in FIG. 14, taken on the line 19—19 thereof;

FIG. 20 is a view of structure, similar to that illustrated in FIG. 12, showing another form of the invention;

FIG. 21 is a sectional view of the structure illustrated in FIG. 20, taken on the line 21—21 thereof;

FIG. 22 is a sectional view of the structure illustrated in FIG. 21, taken on the line 22—22 thereof;

FIG. 23 is a sectional view of the structure illustrated in FIG. 21, taken on the line 23—23 thereof, and FIG. 24 is a sectional view of the structure illustrated in FIG. 1, taken on the line 24—24 thereof.

Referring to FIGS. 1 to 11 inclusive, the element arranging and delivering device of the present invention embodies a base having a pair of uprights 21 which are joined at the front end by a panel 22. A motor 23 on the base operates through a speed reduction unit 24 to drive an eccentric 25 for operating a lever 30 which drives a pitman 26 in reciprocation. The pitman is connected to a hopper 27, as described fully in the above mentioned copending application, for producing the oscillation of the hopper from the full line raised position to the broken line lower position.

The hopper as illustrated in FIGS. 1, 4 and 5 is made up from a bottom panel 28 having a rearward slot 18 and a forward slot 19. The ends of the panel are reversely bent on an arc to extend toward each other at the top at 29 and 30, the end of the portion 30 being flanged downwardly at 17 to provide strength. Each of a pair of dish-shaped side panels 31 has an offset flange 32 which extends over the side edges of the bottom panel and is welded thereto. The dish-shaped panels and the ends 29 and 30 of the bottom panel define an opening through which the articles to be arranged pass when filling the hopper. The hopper is supported by bearing elements 33 on the uprights 21 and is oscillated by the pitman 26 which is pivotally secured to a stud 34 on the side of a panel 31, as illustrated in FIG. 4.

The downwardly extending flanges 37 at the side of the slot 18 support a pair of spaced rail elements 39 within the slot 18 from which the rails 39 extend upwardly to the center of the bearing elements 33. A pair of screws 38 secure the ends of the rail elements 39 to the flanges 37 and side panels 35 are secured to each side of the extending rail members 39 to enclose the area directly beneath the rail members. A bar 36 spaces the rail members 39 near the outer end to maintain a space 41 of equal width between the two bars, the bar 36 being secured to the panels 35 by screws 38. The rail members 39 are spaced apart to provide a depth of slot for collecting small nails which are suspended by their heads on the members in aligned relation so as to slide therealong and be delivered from the forward end of the bar. A U-shaped element 40 is disposed within the slot 19 to have the web portion 15 and the two side portions 14 thereof provide wall portions for the slot extending within the front portion of the hopper.

As illustrated in FIG. 7, the forward ends of the rail members 39 have blocks 42 secured thereto for supporting pivot pins 43. The pivot pins extend within headed bushings 44 in the ends of rails 45 which extend outwardly of the hopper 27 in the slot 19. The pins 43 are aligned with the bearing elements 33 of the hopper, permitting the rails 39 to deliver the nails or other elements to the rails 45 when the hopper is in upper position. A guard 47 is secured to the web 15, extending downwardly over the rails 39 to prevent the element from passing from the rails when not properly engaged thereby.

To interrupt the delivery of the elements from the rails 39 to the rails 45 when the latter rails are filled with the elements, a cam operated lever 48 is secured to the inner wall 14 by a screw 49, as illustrated in FIG. 11. The wall is provided with a flange 51 in which a threaded sleeve 52 on the lever 48 extends, retained in position by the screw 49 and a washer 53. Below the screw 49 the lever 48 extends downwardly to form a cam 54 which is in position to be engaged by a roller 55 on an arm 56 secured to the tracks 45 by a screw 57, as clearly illustrated in FIGS. 6 and 10. The forward end of the arm 56 has a finger 58 which extends over the slot 41 between the rails 45 against which the finger 58 is urged by a spring 59. A cam 61 is mounted on the hopper in alignment with the roller 55 in position to engage the roller when the hopper is in its lower position. When the roller is so engaged, the finger 58 is raised from the rails 45, permitting the elements on the upper part of the rails to slide downwardly thereon. If the rails are filled with elements, the finger will engage the top thereof and maintain the roller 55 out of position of engagement with the cam 54, permitting a spring 62 connected to the lever 48 and to a wall 15 to rotate the lever counterclockwise and move a finger 63 thereof onto the top of the rails 39 and prevent the delivery of the elements from the rails to the rains 45. This delivery will be prevented so long as the elements are beneath the finger 58, but when the finger 58 again engages the rails 45, when the lever 56 is oscillated, the roller 55 will be in position to engage the cams 54 and raise the finger 63 so that delivery can again occur.

As illustrated in FIG. 9, one of the rails 45 has a guard 64 secured thereto, with an end extending above the slot 41 so as to prevent the elements from changing position while in the slot between the rails. A notch 65 is provided in the guard 64 adjacent to the finger 58 to permit the finger to be raised and lowered. After the elements have been delivered to the rails 45, they are prevented from passing from the lower end thereof by a delivering mechanism 66. The mechanism embodies a shuttlelike lever 67 having downwardly extending flanges 68 which support pointed studs 69, with the points 71 in spaced relation to each other the width of the body of the nail. The studs extend through apertures 72 in the rails 45 in a position to engage the body of a nail. An arm 73 on the lever 67 is actuated by a rod 74 on a piston 75 within a cylinder 76 to which a fluid is delivered by a conduit 77. A spring 78 returns the piston to the end of the cylinder supplied by the fluid when the fluid supply is cut off from the cylinder. As the nails are released by the studs 69, they pass from the ends of the rails 45 into a tube 79 at the end of the rails and then into a flexible tube 81 from which they are delivered to an operating device.

The rails 45 are supported at the lower end on an arm 82 which is secured to the panel 22 by screws 83. The motor reciprocates the hopper between the upward full line position, as illustrated in FIG. 1, to the lower dot and dash line position. When in the upper position the nails or other elements are directed onto the rails 39 and the bodies of a number of the nails will engage the slot 41 and slide down the rails 39 onto the rails 45 if not already filled with the elements. Upon the downward movement of the hopper, the nails or elements will slide to the rear end of the hopper and up the arcuate rear portion 29 and be moved inwardly toward the central portion of the panel 28 by the arcuate corner portions of the panels 31. When the hopper is again moved upwardly, the majority of the elements will be disposed in the area of the rails 39 where a substantial number will collect in the slot 41 and be advanced along the rails 39 as the hopper is raised toward its uppermost position.

To prevent the elements on the rails 39 from sliding rearwardly when the hopper is lowered, a bracket 84 is secured to one of the rails 39 and has a pivoted finger 86 thereon aligned with the slot 41 between the rails 39. Upon the lowering of the hopper, the finger 86 will swing backward against a web 87 and retain the elements in the forward end of the rails 39. The delivery of the elements will continue until the finger 58 on the lever 56 rests upon the top of an element, at which time the roller 55 will move out of engagement with the cam 54 sufficiently to permit the finger 63 to drop down on the rails 39 and prevent the elements from being delivered therefrom. As soon as the elements have passed along the rails 45 beyond the finger 58, the finger will engage the top of the tracks the next time it is oscillated to permit the roller 55 to engage the cam 54 and raise the finger 63 to permit the delivery of the elements from the rails 39. The oscillation of the hopper advances the cam 61 to engage the roller 55 to have the finger 58 check each time the hopper is lowered to see whether the rails 45 have been filled to the point at which the finger is positioned. If the rails have been filled, the roller 55 will be moved away from the cam 54 sufficiently to permit the finger 63 to interrupt the delivery of the elements from the rails 39.

In FIG. 5 a multiple purpose hopper 85 is illustrated having a plurality of compartments therein. Each compartment has sets of rails, 39 and 45, permitting different elements to be arranged simultaneously. A partition 90 is provided between the compartments if different elements are to be sorted or the partition or partitions are omitted if the same elements are to be delivered from each set of tracks. The same construction as that illustrated in FIG. 4 is utilized, with the side panels 31 having arcuate side portions 89 for the purpose of directing the elements inwardly toward the tracks 39 when the hopper is in lowered position.

In FIGS. 12 and 13 a similar construction is employed, one in which the pivots 43 are eliminated and the rails 39 and 45 are supported to abut each other at the point 91 on the center line of the pivots 33 of the hopper when the hopper is in raised position. A lever 92 is pivoted on the rails 45 on a bracket 93 and has a forward end 94 which extends into the slot 41 between the rails when the opposite end 95 is in raised position. The end 95 contains an adjustable screw 96 which is aligned with the slot 41 and which, when resting upon the top of a sorted element, causes the end 94 to extend into the slot 41 and prevent the delivery of the elements from the rails 39 to the rails 45. An arm 97 extends from the lever 92 in position to be engaged by the cam 61 on the hopper to cause the end 95 to be raised each time the hopper is lowered. The preponderance of weight of the end containing the screw 96 causes the lever to move to the position illustrated.

Referring to FIGS. 14 to 19, a still further form of the invention is illustrated, that wherein rails 39 and 45 are interconnected by the pivots 43, as illustrated in FIG. 19. In this arrangement, the rails are of slightly different form to be employed for rivets, screws and the like. The rails 39 have upwardly extending fingers 98 and 99 thereon for the purpose of causing the elements to be directed from the rails when sliding therealong and not in proper engagement therewith. A lever 101 is pivoted on the standard 93 and has an adjustable screw 96 on the end 95. The opposite end of the lever contains a finger 102 which is secured by a pivot 103 to the end of the lever 101. A spring 104 urges the finger downwardly to a stop position, with the finger in extension of the lever 101. When the stud 96 rests upon the head of an element, the finger 102 may also engage the head of an element. Strain on the lever 101 is prevented as the finger 102 pivots upwardly on the lever. Sufficient pressure is provided by the spring 104 to prevent the delivery of the elements from the rails 39 to the rails 45. The finger 102 operates within an area outlined by a U shaped stamping 105, having a slot 106 through which the heads of the elements pass. A finger 107 extends forwardly of the slot to eject any elements which are not properly aligned on the rails 39. The lever 101 has a boss 108 extending outwardly therefrom, containing a roller 109 in position to be engaged by the cam 61 on the hopper for oscillating the lever each time the hopper is lowered, for the purpose explained above.

Referring to FIGS. 20 to 23, the hopper 27 is illustrated as being supported on a pair of downwardly extending standards 111 to be oscillated by a pitman operated by a drive similar to that illustrated in FIG. 1 which is suspended thereabove. The structure of the hopper and rails follows that above described in relation to the prior described figures, with rails 130 supported by arms 112 for angular adjustment on the pivots 33 of the hopper. The arms are supported in adjusted angular position about the pivots 33 by screws 113 which extend through the arms 112 and through arcuate slots 114 in the standards. After the rails are adjusted to a desired angle, the nuts on the screws 113 are tightened and the entire mechanism is suspended from the standards 111.

Rail 131 within the hopper is shaped to have a projecting portion 115 for receiving Y-shaped clips 116. The rails 130 form a central slot 117 and have forwardly presenting slots 132 for receiving the leg portions of the clips to prevent them from shifting from the angular portion 115. A hinge element 118 is secured to each side of the rail 131 and blocks 119 are secured to the rails 130. Threaded pintless 121 are screwed within the blocks 119 and journaled in sleeve bearings 122 in bosses 123 which are secured in apertures in the hinge element 118. The rail element 131 has an arcuate end portion which mates in an arcuate recess in the end of the rails 130 so that the ends are mated at all times during the oscillating movement of the hopper 27. It is to be understood that the rail elements will have different cross sections, depending upon the type of element which is to be sorted and delivered, and the invention is not to be limited to the particular rail elements herein illustrated.

What is claimed is:

1. An article arranging and delivering device comprising a hopper having a bottom, front, rear and two side panels, said front panel having a vertical slot therein, pivot means on said side panels disposed above said bottom and rearwardly of said front panel, the rear panel being of arcuate shape in the vertical plane blending smoothly with the bottom panel and curving rearwardly, upwardly and forwardly from the bottom panel, the overall height of said rear panel being substantially coextensive with the overall height of the hopper so that as the rear of the hopper is pivoted downwardly articles in the hopper will slide smoothly along the bottom and onto the rear panel substantially without agitation, a member closing the sides of said slot and extending into the hopper to form pockets on each side thereof, inclined rail means supported within said hopper sloping upwardly from the rear portion thereof and communicating with said slot at a point substantially on the axis defined by said pivot means, exterior rail means extending into the slot at the forward end of the hopper in alignment with the inclined rail means therewithin in position to receive the articles collected thereon when the hopper is pivoted on said pivots, and pivot means joining the adjacent ends of said two rail means together for pivotal movement substantially on the axis defined by the pivots on the side panels of said hopper.

2. An article arranging and delivering device comprising a hopper having a bottom, sides, and front and rear walls, the front wall being of arcuate shape in the vertical plane and below, forward of and above a center in the forward part of the side walls, a pivot on each of the side walls on said center for supporting the hopper for oscillation, the rear wall being of arcuate shape in the vertical plane blending smoothly with the bottom wall and curving rearwardly, upwardly and forwardly therefrom, the overall height of said rear wall being substantially coextensive with the overall height of the hopper so that as the rear of the hopper is pivoted downwardly articles in the hopper will slide smoothly along the bottom and onto the rear wall substantially without agitation, the front wall having a vertical slot therein extending inwardly substantially to said center, a U-shaped member closing said slot and extending inwardly of the front edge of said hopper and containing an outlet opening for the arranged articles adjacent to said center, inclined rail means within said hopper sloping upwardly from the bottom rear portion thereof and communicating through said outlet opening with said slot at a point substantially adjacent to the axis defined by said pivots, exterior rail means extending into the slot at the forward end of the hopper in alignment with the inclined rail means in position to receive the articles collected thereon when the hopper is pivoted on said pivots, means on the exterior rail means for releasably blocking the sliding of articles thereon, means on said hopper responsive to the position of said blocking means on the exterior rail means for releasably preventing the delivery of an article from the inclined rail means when the exterior rail means is substantially filled with the articles, and cam means on said hopper engaging said blocking means on said exterior rail means each time the hopper is lowered to check whether the exterior rail means is filled with articles so that the delivery from the rail means within the hopper will be interrupted.

3. An article arranging and delivering device embodying a hopper having a bottom, sides, and front and rear walls, the front wall being of arcuate shape in the vertical plane and below, forward of and above a center in the forward part of the side walls, a pivot on each of the side walls on said center for supporting the hopper for oscillation, the rear wall being of arcuate shape in the vertical plane blending smoothly with the bottom wall and curving rearwardly, upwardly and forwardly from the bottom wall, the overall height of said rear wall being substantially coextensive with the overall height of the hopper so that as the rear of the hopper is pivoted downwardly articles in the hopper will slide smoothly along the bottom and onto the rear wall substantially without agitation, the front wall of said hopper having a vertical slot therein extending inwardly substantially to said center, a U-shaped member closing said slot and extending inwardly of the front edge of said hopper, said member having an outlet opening therethrough near said center through which the arranged articles may pass, and inclined rail means within said hopper sloping upwardly from the bottom rear portion thereof and communicating through said outlet opening with said slot at a point substantially adjacent to the axis defined by said pivots.

4. An article arranging and delivering device comprising a hopper having a bottom panel which curves upwardly and inwardly at the forward and rear ends to form a smoothly blended surface, the forward end having a vertical slot extending therein, the rear end being of arcuate shape in the vertical plane and curving rearwardly, upwardly and forwardly from the central portion of the bottom panel, the overall height of said rear end being substantially coextensive with the overall height of the hopper so that as the rear of the hopper is pivoted downwardly, articles in the hopper will slide smoothly along the bottom and onto the rear end substantially without agitation, side panels joining said bottom panel following the curvature at the ends thereof with the rear end of the side panels also curved inwardly, coaxially aligned pivots on each said side panel disposed rearwardly of the forward end of said hopper and above the bottom thereof, a U-shaped member closing said slot and containing an outlet opening for the articles in substantial alignment with said pivots, and rail means supported within the hopper sloping upwardly from the rear bottom portion thereof and communicating through said outlet opening with said slot at a point substantially on the axis defined by said pivots.

5. An article arranging and delivering device comprising a hopper having a bottom panel which curves upwardly and inwardly at the forward and rear ends to form a smoothly blended surface, the forward end having a vertical slot extending therein, the rear end being of arcuate shape in the vertical plane and curving rearwardly, upwardly and forwardly from the central portion of the bottom panel, the overall height of said rear end being substantially coextensive with the overall height of the hopper so that as the rear of the hopper is pivoted downwardly, articles in the hopper will slide smoothly along the bottom and onto the rear end substantially without agitation, side panels joining said bottom panel following the curvature at the ends thereof with the rear end of the side panels also curved inwardly, a U-shaped member closing said slot and having an outlet opening for the passage of arranged articles, said member dividing the hopper and forming pockets for articles on each side thereof, rail means supported within the hopper, pivots on the outer side panels adjacent to the forward end, said rail means sloping upwardly from the rear bottom portion of said hopper and communicating through said outlet opening with said slot at a point substantially on the axis defined by said pivots, and means engaged by said pivots for supporting the hopper for oscillating movement.

6. An article arranging and delivering device comprising a hopper having a bottom panel which curves upwardly and inwardly at the forward and rear ends to form a smoothly blended surface, the forward end having a vertical slot extending therein, the rear end being of arcuate shape in the vertical plane and curving rearwardly, upwardly and forwardly from the central portion of the bottom panel, the overall height of said rear end being substantially coextensive with the overall height of the hopper so that as the rear of the hopper is pivoted downwardly, articles in the hopper will slide smoothly along the bottom and onto the rear end substantially without agitation, side panels joining said bottom panel following the curvature at the ends thereof with the rear end of the side panels also curved inwardly, means closing said slot and having an outlet opening for the passage of the arranged articles, said means dividing the hopper and forming pockets for articles on each side thereof, rail means supported within the hopper, pivots on the outer side panels adjacent to the forward end, said rail means sloping upwardly from the rear bottom portion of said hopper and communicating through said outlet opening with said slot at a point substantially on the axis defined by said pivots, means engaged by said pivots for supporting the hopper for oscillating movement, and exterior rail means extending into said slot at the forward end of the hopper in alignment with the rail means therewithin and disposed in position to receive the articles collected thereon when the hopper is in raised position.

7. An article arranging and delivering device comprising a hopper having a bottom panel which curves upwardly and inwardly at the forward and rear ends to form a smoothly blended surface, the forward end having a vertical slot extending therein, the rear end being of arcuate shape in the vertical plane and curving rearwardly, upwardly and forwardly from the central portion of the bottom panel, the overall height of said rear end being substantially coextensive with the overall height of the hopper so that as the rear of the hopper is pivoted downwardly, articles in the hopper will slide smoothly along the bottom and onto the rear end substantially without agitation, side panels joining said bottom panel following the curvature at the ends thereof with the rear end of the side panels also curved inwardly, a member closing the sides of said slot and having an outlet opening for the passage of the arranged articles, said member dividing the hopper and forming pockets for articles on each side thereof, rail means supported within the hopper, pivots on the outer side panels adjacent to the forward end, said rail means sloping upwardly from the rear bottom portion of said hopper and communicating through said outlet opening with said slot at a point substantially on the axis defined by said pivots, means engaged by said pivots for supporting the hopper for oscillating movement, exterior rail means extending into the slot at the forward end of the hopper in alignment with the rail means therewithin in position to receive the articles collected thereon when the hopper is in raised position, and pivot means joining said two rail means together, with the center of the pivot means on the center of the pivots which support the hopper.

8. An article arranging and delivering device comprising a hopper having a bottom panel which curves upwardly and inwardly at the forward and rear ends to form a smoothly blended surface, the forward end having a vertical slot extending therein, the rear end being of arcuate shape in the vertical plane and curving rearwardly, upwardly and forwardly from the central portion of the bottom panel, the overall height of said rear end being substantially coextensive with the overall height of the hopper so that as the rear of the hopper is pivoted downwardly, articles in the hopper will slide smoothly along the bottom and onto the rear end substantially without agitation, side panels joining said bottom panel following the curvature at the ends thereof with the rear end of the side panels also curved inwardly, a member enclosing the sides of said slot and having an outlet opening for the passage of the arranged articles, said member dividing the hopper and forming pockets for articles on each side thereof, rail means supported within the hopper, pivots on the outer side panels adjacent to the forward end, said rail means sloping upwardly from the rear bottom portion of said hopper and communicating through said outlet opening with said slot at a point substantially on the axis defined by said pivots, supporting means engaged by said pivots for supporting the hopper for oscillating movement, exterior rail means extending into the slot at the forward end of the hopper in alignment with the rail means therewithin in position to receive the articles collected thereon when the hopper is in raised position, pivot means joining said two rail means together, with the center of the pivot means on the center of the pivots which support the hopper, a pitman pivoted to said hopper, and drive means for operating said pitman in reciprocation for oscillating said hopper.

References Cited in the file of this patent

UNITED STATES PATENTS

| 108,295 | Rogers | Oct. 11, 1870 |
|---|---|---|
| 276,639 | Smith | May 1, 1883 |
| 529,701 | Briggs | Nov. 27, 1894 |
| 555,572 | Gruendel | Mar. 3, 1896 |
| 876,086 | Pearson | Jan. 7, 1908 |

(Other references on following page)

UNITED STATES PATENTS

| | | |
|---|---|---|
| 1,095,193 | Curtis | May 5, 1914 |
| 1,145,774 | Kotkovsky | July 6, 1915 |
| 1,156,109 | Stevens | Oct. 12, 1915 |
| 1,167,805 | Elliott | Jan. 11, 1916 |
| 1,481,064 | Ochs | Jan. 15, 1924 |
| 1,482,427 | Boutin | Feb. 5, 1924 |
| 1,546,915 | Calkins | July 21, 1925 |
| 1,624,872 | Kingsbury et al. | Apr. 12, 1927 |
| 1,765,180 | Schrun | June 17, 1930 |
| 1,812,501 | Strobel | June 30, 1931 |
| 1,839,920 | Henry | Jan. 5, 1932 |
| 1,845,651 | Dickson | Feb. 16, 1932 |
| 1,888,520 | Twomley | Nov. 22, 1932 |
| 1,950,909 | Totman | Mar. 13, 1934 |
| 2,161,973 | Paxton | June 13, 1939 |
| 2,245,165 | Spry | June 10, 1941 |
| 2,540,934 | Cook et al. | Feb. 6, 1951 |
| 2,546,866 | Overly | Mar. 27, 1951 |